United States Patent [19]
Jackson et al.

[11] 3,772,857
[45] Nov. 20, 1973

[54] WATER AIR SEPARATOR

[75] Inventors: Richard H. Jackson, Downers Grove; George H. Schulz, Naperville, both of Ill.

[73] Assignee: Gits Bros. Mfg. Co., Chicago, Ill.

[22] Filed: Aug. 23, 1971

[21] Appl. No.: 173,984

[52] U.S. Cl. .................. 55/418, 55/485, 55/487, 55/503, 55/510, 55/524
[51] Int. Cl. ............................................. B01d 51/00
[58] Field of Search ................... 55/510, 524, 418, 55/498, 500, 503, 502, 527, 485, 487, DIG. 25, DIG. 31, 324

[56] References Cited
UNITED STATES PATENTS

| | | | |
|---|---|---|---|
| 3,002,870 | 10/1961 | Belgarde et al. | 55/510 X |
| 3,494,114 | 2/1970 | Nelson et al. | 55/498 X |

FOREIGN PATENTS OR APPLICATIONS

| | | | |
|---|---|---|---|
| 969,613 | 9/1964 | Great Britain | 55/502 |

*Primary Examiner*—Frank W. Lutter
*Assistant Examiner*—William Cuchlinski, Jr.
*Attorney*—Carlton Hill et al.

[57] ABSTRACT

A unitized take-apart water separator including a cylindrical housing formed of two cup-shaped units placed face to face, one of said units having an entrance tube through the bottom wall thereof communicating to an interior baffle which directs the intake fluid to the interior periphery of the assembled housing. The other cup-shaped unit has an outlet tube communicating through its bottom of the interior of a filter capsule, the filter capsule being circular and having an outer diameter less than the inner diameter of the housing, the two cup-shaped units held together by a common axial stud and disassemblable one from the other.

3 Claims, 2 Drawing Figures

PATENTED NOV 20 1973 3,772,857
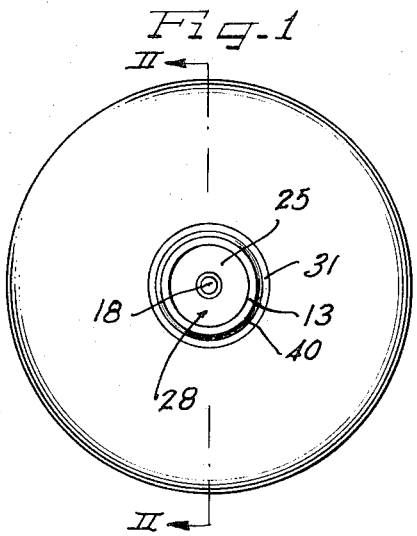
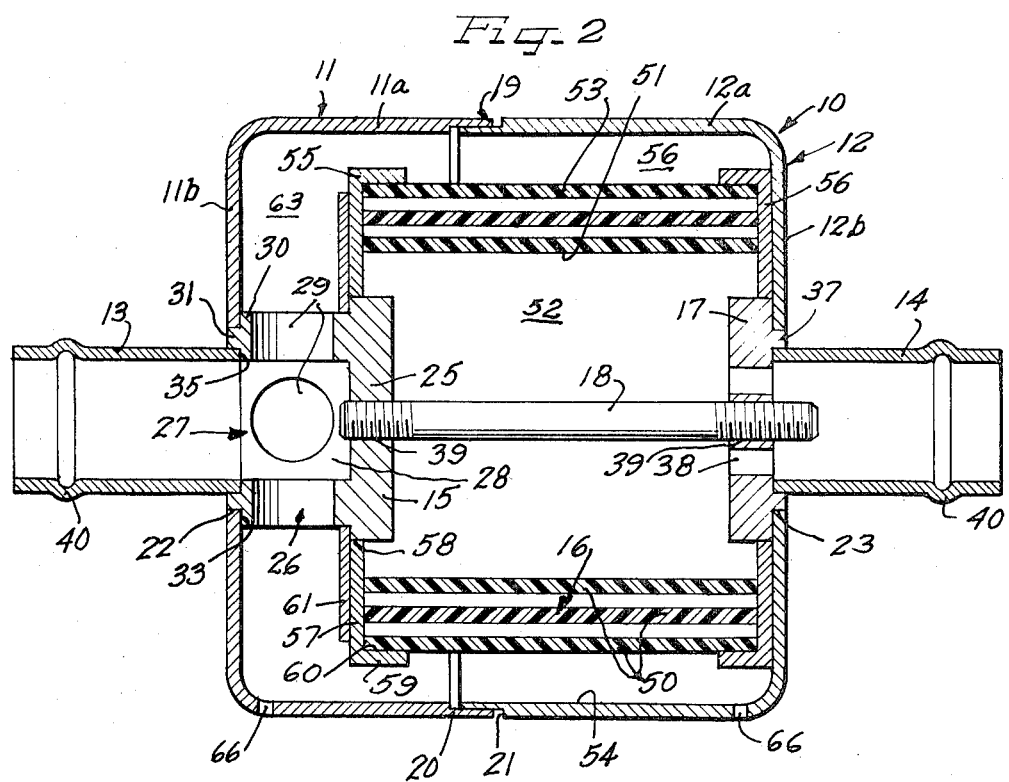
INVENTORS
Richard H. Jackson
George H. Schulz
BY  Hill, Sherman, Meroni, Gross & Simpson ATTORNEYS

WATER AIR SEPARATOR

BACKGROUND OF THE INVENTION

1. Field of the Invention

This invention relates to a water-air separator and more particularly to a unitized take-apart separator.

2. Prior Art

Water-air separators utilizing filters have been known to the art. Further, axial flow separators have also been known which combine a housing having a filter interior thereof with inlet and outlet tubes accepting an axial flow. Such prior art filters normally pass the fluid stream through the filter retaining the water on one side of the filter and allowing air to pass therethrough.

Such prior art filters, while generally workable from a separation standpoint have usually been awkward or cumbersome to manufacture and have normally required that the housing be sealed.

On the other hand, the prior art separators which were not permanently sealed and which allowed access to the interior housing for removing the filter and replacement and/or other reasons such as clearance of blockages have generally been complex and were not easy to disassemble which added to their cost of manufacture, assembly, and use.

SUMMARY OF THE INVENTION

This invention improves upon prior art designs by providing a unitized water-air separator with take-apart features. The separator consists basically of two cup-shaped housing members which are bolted together in face-to-face relation. Each of the housing members has a tube projecting from the bottom wall communicating with the interior. One of the housing members communicates the tube to an interior baffle arrangement which redirects the air-water mixture to the interior periphery. The other cup-shaped member communicates the interior through an outlet adapter having passage openings therethrough communicating to the outlet tube. A cylindrical filter unit is entrapped between the baffle and the inner end wall of the cup-shaped member having the outlet adapter. The filter unit has an outer diameter less than the inner diameter of the assembled housing and the housing has drainage openings therethrough. Therefore air-water is ported to the interior through the inlet tube thence into the baffle where it is directed to the inner periphery thence through the filter to the center of the unit. The interior of the filter is communicated to the outlet tube through the outlet adapter. The filter is designed to separate the water from the air, maintaining the water in the outer peripheral area of the interior of the housing where it drains away through the drain holes. The unit is held assembled together by a threaded-ended stud projecting between the back wall of the baffle and a center opening in the outlet adapter. The unit can be disassembled merely by rotating one cup-shaped housing member with respect to the other to unthread one of the members off the stud. To aid in this, the stud can be permanently affixed to one of the housing attached members.

Therefore, an object of this invention is to provide an improved separator.

It is another object of this invention to provide a fluid separator with a filter unit entrapped in a take-apart housing, the filter unit effective to separate the fluids to different areas of the housing.

It is still another and more specific object of this invention to provide a take-apart fluid separator of the axial flow type wherein separation is accomplished through a cylindrical filter positioned interiorly of a cylindrical two-piece housing, the housing having an inlet directing fluid via a baffle to an outer peripheral area of the interior of the housing and an outlet communicating to the center of the housing with the filter dividing the space between the outer peripheral area and the center of the housing, the filter effective to separate fluids passing therethrough whereby one desired fluid remains on the outer peripheral side of the filter while the other fluid is passed through to the center.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1 is a plan view of the inlet end of the separator of this invention; and

FIG. 2 is a cross-sectional view of the fluid separator of this invention.

DESCRIPTION OF THE PREFERRED EMBODIMENTS

FIG. 2 is a cross-sectional view of the fluid separator 10 of this invention. The separator consists of an inlet housing 11, an outlet housing 12, inlet and outlet tubes 13 and 14, a baffle 15, a filter 16, an outlet adapter 17 and a stud 18.

Each of the housing members 11 and 12 is substantially cup-shaped having a peripheral diameter wall 11a and 12a and a bottom wall 11b and 12b. Adjacent their open ends 19 the housing members 11, 12 are stepped so as to provide an overlap when assembled together open end to open end. In the embodiment illustrated, the inlet housing member 11 is stepped with an inner diameter surface relief ledge 20 while the outlet housing member 12 is stepped with an outer diameter relief ledge 21 so that when the housing members are assembled together in open end to open end facing contact, portions of the outlet housing member 12 will project into the ledged area of the inlet housing member as illustrated at 19. This overlapping coupling assures alignment of the two housing units while aiding in the provision of a seal at the joint.

The inlet and outlet tubes 13 and 14 are centrally located axially of the housing. Each housing member 11, 12 has a central axial hole 22, 23 through the bottom wall 11b, 12b. The baffle 15 is attached to the bottom wall 11b of the inlet housing member 11a interior of the cup-shaped housing member. The baffle consists of a radial wall 25 at one axial end thereof and a circumferential peripheral wall 26 projecting axially from the radial wall 25 producing a cup-shaped baffle. The baffle is open at the end 27 opposite the radial wall 25 and has a central chamber 28. A plurality of openings 29 are provided through the peripheral wall 26 communicating the exterior of the baffle to the central opening 28. The axial end 30 of the baffle opposite the radial wall 25 has an axial projecting circumferential tongue 31 spaced intermediate its inner and outer diameters. The tongue 31 fits through the opening 22 with the ledge 33 provided by the material from the tongue 31 to the outer diameter overlying the inside surface of the bottom wall 11b. The tongue 31 has an axial thickness approximately equal to the thickness of the housing portion 11a so that it terminates flush with the outer surface of the bottom wall 11b. The inlet tube 13 has an outer diameter equal to the inner diameter of the tongue 31 and is received therein bottoming against the ledge 35 created by the remainder of the material from the inner diameter of the tongue 31 to the inner diameter of the peripheral wall 26 of the baffle. Thus the axial end 30 of the baffle is nestled in the opening 22 of the inlet cover with the tongue projecting through the opening flush to the exterior. In turn the tube 13 is nestled in the open end of the baffle radially inwardly of the opening 22.

The outlet adapter is attached to the bottom wall 12b of the outlet housing member 12 in substantially the same manner. The outlet adapter 17 is a disc having an axially projecting tongue 37 and one radial face thereof, the tongue being circumferential and being spaced from the axis substantially the same as the tongue 31 of the baffle. The tongue 37 is received in the opening 23 in the same manner as the tongue 31 of the baffle and the tube 14 is received inwardly of the tongue 37 in the same manner as the tube 13 is received inwardly of the tongue 31. The disc-shaped outlet adapter 17 has a plurality of openings 38 axially therethrough, the openings spaced from the axis of the outlet adapter and terminating radially inwardly of the inner diameter of the tube communicating the interior of the housing to the interior of the tube.

Both the baffle and the outlet adapter have openings 39 therethrough axially located. The openings receive the threaded ends of a stud 18. The openings 39 may be threaded with complementary threads to the stud.

Both the outlet adapter 17, the baffle 15, and the tubes 13 and 14 are welded together and to the respective back walls 11b, 12b. Therefore when the unit is assembled together with the stud 18 threaded into the openings 39, the housing members 11, 12 may be rotated with respect to one another to tighten the unit together in assembled relation. Alternatively, the stud may have means for independent rotation such as a screw driver slot in an axial end to aid in the assembly.

Of course it is to be understood that the stud could be permanently affixed in either the baffle or the outlet adapter in non-rotatable relation therewith so that the device is assembled by threading the other of either the baffle or outlet adapter onto the other end of the stud.

The outer diameter of the tubes may have bulges 40 circumferentially therearound positioned to facilitate attachment of hoses or tubing to the inlet and outlet tubes.

A filter element 16 is positioned interiorly of the housing and may include a plurality of cylindrical filter members. The members are nestled concentrically and may be slightly radially spaced from one another in the design illustrated. In the preferred embodiment the filter media may consist of two different densities of glass fibers with a phenolic resin binder. Either galvanized hardware cloth or perforated steel with a corrosion resistant finish can be used for structural support. A vinyl coated fiberglas screen may be further used around the outside of the filter element. The filter element may consist of a plurality of tubes as illustrated or may be a monolithic unit structured of various layers or the like. Such filter elements for filtering fluid streams, and especially for filtering streams of combined water vapor and air are known to the art. Normally such filters pass the air while screening out the water vapor.

The filter unit 16 is positioned interiorly of the housing concentric with the center thereof and has an inner diameter 51 radially spaced from the axial center of the unit so as to provide an open chamber 52 surrounding the stud 18. The chamber is open to the outlet tube through the openings 38 in the outlet adapter 17. The filter unit has an outer diameter 53 less than the inner diameter 54 of the cup-shaped housing members 11 and 12 whereby when filter unit 16 is positioned in the housing, it forms a cylinder dividing the interior of the housing into the space 52 and a space 56 between the outer diameter, the filter and the inner diameter of the housing.

The filter unit 16 is retained in place in the housing by enclampment between two ring-shaped retaining members 55 and 56. The retaining members each have radial walls 57 projecting radially outwardly from a central opening 58 and terminating in an axially expanding peripheral wall 59 which has an inner diameter 60 equal to the outer diameter of the filter element 16. The inner diameter 58 of each of the rings is received in turn around the outer diameter of either the back wall 25 of the baffle 15 or the outer diameter of the outlet adapter 17. The rings 55 and 56 may be permanently affixed to the filter element 16 to form a filter capsule consisting of the wall, filter media, and the rings. In which case, a backing element such as the washer 61 is permanently affixed to the baffle 15 as illustrated. The filter capsule is then insertible into the housing and is enclamped between the washer 61 and the back wall 12b.

Of course, in other embodiments, the rings 55 and 56 may themselves be permanently affixed to the baffle and outlet adapter respectively, and the filter unit can consist solely of a tubular member open at both ends.

In the embodiment illustrated, the washer and the back wall provide dimensional stability to the rings 55 and 56 and the filter unit is received interiorly of the axially extending peripheral walls 59. The ring 55 is spaced from the back wall 11b of the housing member 11 by a distance at least equal to the openings 29 in the baffle. In this way a space 63 is provided between the washer 61 and the back wall 11b, the space 63 being open to the interior of the baffle through the openings 29. The rings 55 and 56 are non-porous and effectively block off the interior of the housing to the spaces 63 at one end of the inlet housing and the peripheral space 56 outwardly of the filter unit. The space 52 then is accessible only through the filter from the space 56 and the space 63. Thus the flow of combined fluids from the inlet tube is diverged through the baffle to the space 63 thence to the space 56 thence through the filter unit 16 to the space 52 thence out through the openings 39 in the outlet adapter to the outlet tube 14.

The filter will effectively strain the desired fluid, in the preferred embodiment, water vapor from the air stream retaining the water within the outer periphery of the housing in the space 56 and the space 63. Drainage openings 66 are provided through the cup-shaped housing members 11 and 12 to the exterior of the unit to allow drainage of the water from the space 56-63.

When it is desired to replace the filter unit all that has to be done is to unthread the cup-shaped housing members from one another by unthreading them on the stud 18 thereby opening the interior and allowing the filter unit to drop out of the now housing. Replacing a new filter unit in the housing and rethreading the housing recloses the unit. Therefore, it can be seen that this invention provides an easy take-apart fluid separator which allows for ease of replacement of the filter.

In order to prolong the life of the housing, which, due to its take-apart feature, does not have to be discarded with the filter, the housing members may be cadmium plated steel or otherwise constructed of non-degradable material. The various connecting points can all be welded or soldered to firmly attach the individual units to their backing portions.

It can therefore be seen from the above that our invention provides a unique take-apart fluid separator which is compact, economical to manufacture, sturdy, easily assembled, and simple to maintain and which allows convenience of filter replacement.

Although various minor modifications might be suggested by those versed in the art, it should be understood that I wish to embody within the scope of the patent warranted hereon all such embodiments as reasonably and properly come within the scope of my contribution to the art.

I claim:

1. A water-air separator comprising a hollow cylindrical housing with end walls having an inlet tube in one end wall communicating to the interior of the housing, an outlet tube in the other end wall communicating to the interior of the housing, a baffle means in the interior affixed to the one end wall adjacent the inlet tube, said baffle means changing the axial flow of fluid from the inlet tube to a radial flow interior of the housing adjacent the one end wall, a filter unit in said housing, said filter unit effective to separate water out of a water saturated air stream, said filter having a hollow interior, said filter unit having an exterior dimension less than the interior dimension of the housing, said filter unit positioned substantially between the baffle means and the interior of the said other end wall, the interior of the filter unit open to the outlet tube through an end wall of the filter unit, a space surrounding the filter unit interior of the housing, said space open to the baffle means receiving the radial flow therefrom, said housing disassemblable to give axcess to the filter unit whereby said filter unit is easily changed, the baffle means having a radially projecting wall associated therewith and the filter unit entrapped between the said radially projecting wall and the said other end wall, the filter unit having walls at both ends thereof, each of said walls having openings centrally located therethrough, the housing having an outlet adapter associated with said other end wall, the outlet adapter having openings therethrough communicating with the outlet tube, the outlet adapter having a circular peripheral wall projecting into the interior of the housing from the said other end wall, the filter unit assembled in the said housing with the outlet adapter projecting into an opening in one of the end walls of the filter unit and the baffle means having a portion projecting into an opening in the other end wall of the filter unit to suspend the filter unit in the housing entrapped between the radially projecting wall associated with the baffle means and the other end wall of the housing.

2. The water-air separator of claim 1 wherein a threaded-ended stud extends between the baffle means and outlet adapters and the housing is composed of two cup-shaped members assembled in open-face-to-open-face relation and maintained in said relation by attachment of the ends of the stud to the baffle means and the outlet adapter respectively, the said baffle means permanently affixed to one of the said cup-shaped housing units and the outlet adapter permanently affixed to the other of the said cup-shaped housing members, the stud being detachable from at least one of the baffle means and outlet adapter.

3. A water-air separator comprising: a housing, the housing including two cup-shaped members having bottom and peripheral walls, the members assembled together in open-face-to-open-face position, the members defining an interior space, each of the members having openings through their bottom walls, one of the members having an inlet conduit connected adjacent the opening through the bottom wall of the one member, the conduit open to the interior space, an inlet baffle means interior of the members connected to the one member adjacent the opening through the one member, the baffle means changing an axial flow from the inlet conduit to a substantially radial flow within the interior space, the other of said members having an outlet conduit attached thereto adjacent the opening through the bottom wall of the other of said members, the outlet open to the interior space, an outlet adapter attached to the other of said members in juxtaposition to the opening and bottom wall of the other end of said members the outlet adapter and outlet conduit communicating an area exterior of the housing to the interior of the housing, a tubular air-water separator filter unit having a length less than the length of the interior space and a diameter less than the diameter of the interior s ace received in the space between at least portions of the baffle means and the bottom wall of the other of said members, the unit dividing the interior space into a radially inner and a radially outer area defined by a tube wall of the unit and closed from one another, the radial flow from the baffle means directed to the outer area, the inner area open to the outlet, a closure device extending between and attached to the baffle means and the outlet adapter interior of the members and being releasable from at least one of said baffle means and outlet adapter, the closing device effective to maintain said members in open-face-to-open-face positon when attached to both the baffle means and outlet adapter.

* * * * *